UNITED STATES PATENT OFFICE.

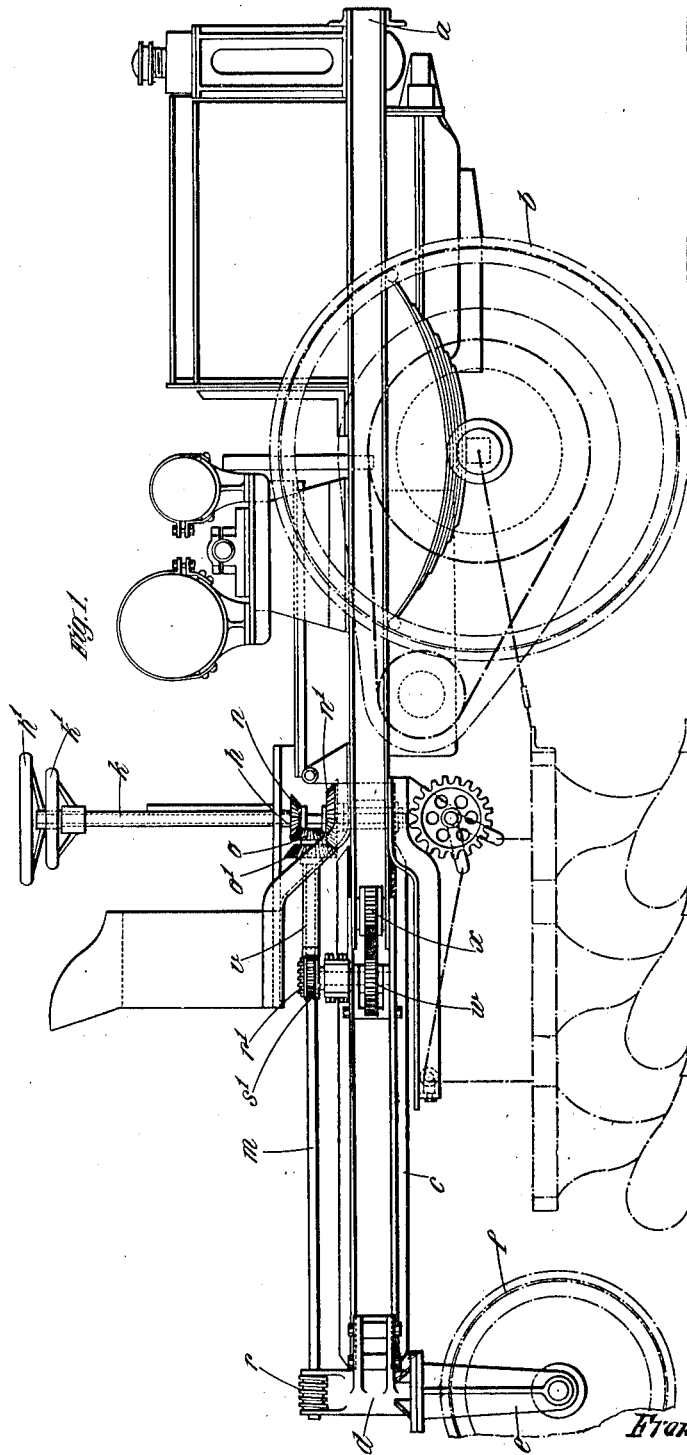

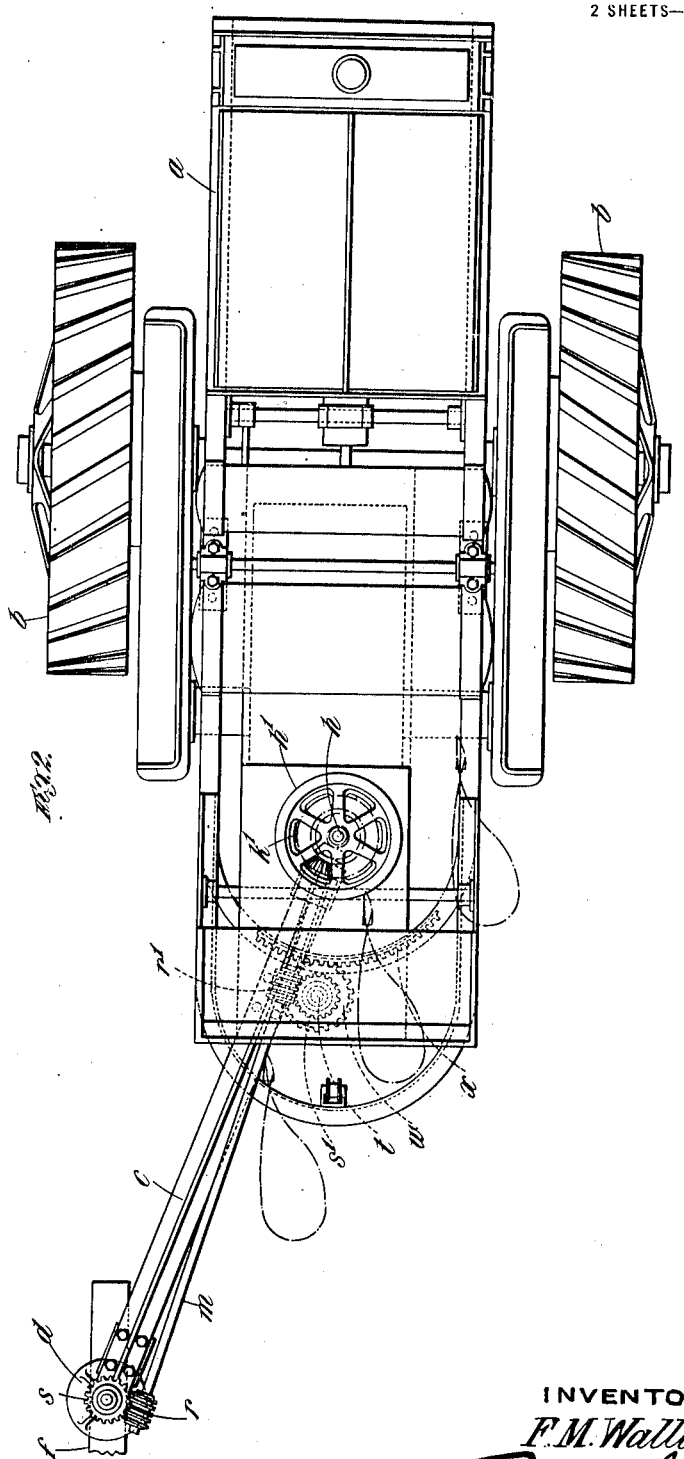

FRANCIS MARK WALLER, OF STAFFORD, ENGLAND.

MECHANICAL TRACTOR FOR AGRICULTURAL PURPOSES.

1,274,473.  Specification of Letters Patent.  Patented Aug. 6, 1918.

Application filed April 14, 1917. Serial No. 162,154.

*To all whom it may concern:*

Be it known that I, FRANCIS MARK WALLER, a subject of the King of Great Britain and Ireland, residing at 11 Brunswick Terrace, Stafford, in the county of Stafford, England, have invented a certain new and Improved Mechanical Tractor for Agricultural Purposes, of which the following is a specification.

This invention relates to mechanical tractors for agricultural purposes of the purely tractor type, *i. e.* the type in which the tilling implement is not rigidly connected to or carried by the tractor and in which the tilling implement therefore takes no part in controlling or affecting the steering, and it consists of an improved method of steering which gives a positive dual control in which the resistance of the tilling implement takes no part, the object being to give a complete and steady control when the tractor is running in a forward direction, as for instance when plowing, and a rapid or short turning movement when it is required to turn in a limited space, such for instance as at the headlands.

According to the present invention, the weight of the tractor is mainly carried on two driving wheels, the stability of the machine being obtained from a third wheel which is located at a convenient distance behind said pair of wheels. This third wheel is carried in a fork or frame which is mounted by means of a vertical pivot—so that it can be turned through an axis incidental with the point of contact of the wheel with the ground—in a frame or beam which is pivoted to the main frame of the tractor in a suitable position to the rear of the axis of the driving wheels, said position being such as will allow the plow or other implement to be trailed directly behind said driving wheels as shown in dotted lines in the accompanying drawing. Mounted concentrically with this point of pivot are two concentrically arranged shafts, one of which is coupled to the fork carrying the third wheel by means of suitable gearing, and the other of which is coupled, also by means of a suitable gearing, to a spindle which carries a spur wheel which gears with a segmental rack carried by the main frame of the tractor. Each of the concentric shafts is provided with a steering wheel so that the tractor can be steered either directly through the spur wheel and rack, which sets up relative movement between the two frames, or indirectly by the action of the third wheel, or by both mechanisms.

The frame or beam carrying the third or rear wheel is preferably so arranged that it can be locked to the main frame to offset said wheel to any desired extent, and means is provided for rendering one or other of the steering systems inoperative while the other is in use.

In the accompanying drawing which illustrates this invention:—

Figure 1 is a view in side elevation of a tractor showing only the parts essential to the present invention, and Fig. 2 is a view thereof in plan.

Throughout the views similar parts are marked with like letters of reference.

The main frame $a$, which is carried by a pair of wheels $b$ $b$—one or both of which may be driven—carries the whole of the power and transmission plant, which forms no part of this invention and may therefore be of any suitable type and construction. At or near the rear end of the main frame $a$ at a point behind the axis of the wheels $b$ is pivoted a secondary frame or beam $c$ at the free or rear end of which is formed a vertical steering head $d$ in which is mounted a fork $e$ carrying a third wheel $f$. Mounted in suitable bearings carried by the main frame $a$ and preferably concentrically arranged in relation to the point of pivot of the secondary frame or beam $c$ to said main frame are two concentrically arranged shafts $h$ and $k$ which are mounted in suitable bearings and are provided at their upper ends with hand wheels $h^1$ and $k^1$ for the purpose of steering the tractor by simultaneously setting up relative movement between the main and secondary frames and turning the third or rear wheel about its point of pivot.

The outer tubular shaft $k$ carries a bevel wheel $n$ and the inner shaft $h$ a bevel wheel $n^1$. The former ($n$) gears with a bevel wheel $o$ mounted on a shaft $m$ carried in suitable bearings on the secondary frame $c$, and the latter ($n^1$) gears with a bevel wheel $o^1$ mounted on a tubular shaft $v$ running on the shaft $m$. The motion of the shaft $m$ is communicated to the fork $e$ carrying the third wheel $f$ by means of a worm $r$ and worm wheel $s$. The motion of the shaft $v$ imparts relative movement to the two frames $a$ and $c$ through a vertically arranged spindle $t$ which is mounted in a suitable bearing carried by the secondary frame $c$ and is in gear with the shaft $v$ by means of a worm $r^1$ and worm wheel $s^1$ and said spindle carries a spur wheel $w$ which gears with a toothed quadrant $x$ carried by the main frame $a$.

By employing a worm and worm wheel in each of the steering mechanisms the same become irreversible so that until they are operated they remain locked and when one is operated the other automatically remains locked. Instead of using worm gearing, spur or other suitable gearing may be employed, in which case clutches or other locking devices will be necessary both to lock the secondary frame or beam in its desired position in relation to the main frame, either offset for the purpose of drawing a plow or other tilling implement, or centrally for general traction purposes, and/or to lock the fork carrying the third wheel in its pivotal bearing.

It will be appreciated that when this tractor is used for drawing plows or other tilling implements it is steered by the hand wheel $k^1$ which operates to vary the relative positions of the main and secondary frames $a$ and $c$, and when used for ordinary traction purposes it may be steered either by the hand wheel $k^1$ or by the hand wheel $h^1$ which controls the rear wheel, and further, that both the steering mechanism can be simultaneously operated when it is desired to turn the tractor in a circumscribed space, for the purpose for instance of reducing to a minimum the headlands of the field.

What I claim as my invention and desire to secure by Letters Patent is:—

1. A mechanical tractor for agricultural purposes comprising a main frame carrying a pair of driving wheels, a secondary frame pivoted to the main frame to the rear of said driving wheels, a wheel pivotally mounted in a head carried by the secondary frame, and duplicate steering mechanisms whereby the tractor can be steered by simultaneously setting up relative movement between the two frames, and turning the rear wheel about its pivotal axis.

2. A mechanical tractor having three wheels two of which are arranged in parallel relation to one another at a suitable distance apart so as to form a pair and one or both of which may be driven, and the other of which is arranged behind the aforesaid pair of wheels and is capable either of being placed to run centrally with respect to said pair of wheels or of being offset to either side, the pair of wheels being mounted on the main frame and the third wheel on a secondary frame or beam which is pivoted to the main frame at a suitable distance behind the axis of the pair of wheels; irreversible mechanism operated by a hand wheel for steering the vehicle about the point of pivot of the two frames and similar mechanism for steering the vehicle about the point of pivot of the third wheel.

3. In a mechanical tractor for agricultural purposes the combination of a main frame, a pair of driving wheels carried by said frame, a secondary frame pivoted to the main frame to the rear of the driving wheels, a third wheel pivotally mounted in said secondary frame, mechanism operated by a hand wheel for setting up relative movement between the two frames at their points of pivot, mechanism operated by a hand wheel concentrically mounted in relation to the before named hand wheel for turning the rear wheel about its pivotal axis in the secondary frame, and means for locking both of said mechanisms so that either can be rendered inoperative while the other remains operative.

4. In a mechanical tractor for agricultural purposes the combination of a main frame, a pair of driving wheels carried by said frame, a secondary frame pivoted to the main frame to the rear of the driving wheels, a third wheel pivotally mounted in said secondary frame, hand wheel operated mechanism for setting up relative movement between the two frames at their points of pivot, hand wheel operated mechanism for turning the rear wheel about its pivotal axis in the secondary frame, and means for setting and fixing the secondary frame or beam carrying the rear wheel in varying positions in relation to the main frame.

5. In a mechanical tractor for agricultural purposes the combination of a main frame, a pair of driving wheels carried by said frame, a secondary frame pivoted to the main frame to the rear of the driving wheels, a third wheel pivotally mounted in said secondary frame, irreversible mechanism for setting up relative movement between the two frames at their points of pivot, and irreversible mechanism for turning the rear wheel about its pivotal axis, both mechanisms being so arranged as to be capable of simultaneous operation.

6. In a mechanical tractor for agricultural purposes the combination of a main frame, power mechanism carried by said frame, a pair of driving wheels carrying said frame, a secondary frame pivoted to the main frame at the rear of the axis of the driving wheels, a wheel pivotally mounted at the rear of said secondary frame, mechanism controlled by a hand wheel for setting up relative motion between said two frames, means for locking said mechanism, mechanism controlled by a hand wheel for turning the wheel carried by the secondary frame about its pivotal axis, said hand wheel being mounted in concentric relation to the hand wheel of the other steering mechanism, means for locking said wheel in relation to the secondary frame, and means for setting and fixing the offset position of the secondary frame in relation to the main frame.

In testimony whereof I have signed my name.

FRANCIS MARK WALLER.